United States Patent [19]

Nutt

[11] Patent Number: 4,813,585
[45] Date of Patent: Mar. 21, 1989

[54] LADDER RACK

[75] Inventor: Wallace H. Nutt, Ontario, Canada

[73] Assignee: Teledyne Canada Limited, Ontario, Canada

[21] Appl. No.: 135,370

[22] Filed: Dec. 21, 1987

[51] Int. Cl.[4] .............................................. B60R 9/04
[52] U.S. Cl. .................................... 224/324; 182/127; 224/325
[58] Field of Search ................ 224/324, 325, 315, 309, 224/42.38; 182/127; 248/503

[56] References Cited

U.S. PATENT DOCUMENTS

| 2,615,667 | 10/1952 | Smith et al. | 224/324 |
| 3,672,612 | 6/1972 | Laing, Jr. | 182/127 |
| 3,722,766 | 3/1973 | Barrineau et al. | 224/324 |
| 3,888,398 | 6/1975 | Payne | 224/310 |
| 4,170,331 | 10/1979 | Faulstich | 224/324 |
| 4,262,834 | 4/1981 | Nutt | 224/324 |
| 4,618,083 | 10/1986 | Weger, Jr. | 224/324 |

FOREIGN PATENT DOCUMENTS

| 7822052 | 7/1978 | France. | |
| 2185949 | 8/1987 | United Kingdom | 224/315 |

Primary Examiner—Renee S. Luebke
Attorney, Agent, or Firm—Ridout & Maybee

[57] ABSTRACT

A vehicle ladder rack is for storage of a ladder upon the roof of a vehicle. The rack comprises a horizontal frame, at one end of which a hooked clamping bar engages a ladder rung. The clamping bar is manually operable, pivoting about a horizontal axis from a lower release position through an upper intermediate position and sliding downwardly to a clamped position. Manually operable means comprises several levers and rotating shafts providing a resilient clamping of the ladder rung, and latching in the clamped position.

21 Claims, 5 Drawing Sheets

LADDER RACK

BRIEF SUMMARY OF THE INVENTION

The invention is directed to a ladder supporting rack for storage of a ladder upon the roof of a vehicle. The ladder rack comprises a horizontal frame and means to restrain or limit transverse, longitudinal and vertical movement of the ladder.

In conventional ladder racks a horizontal frame comprises forward and rearward transverse beams spanning over the roof between support brackets usually attached to the outer edge of the vehicle roof gutter seam. The ladder is supported in a horizontal position between lateral abutments attached to the beams which restrain transverse movement of the ladder. Typically the outer lateral abutment is a bar running longitudinally from one beam to the other with an upwardly projecting extension on at least one end.

Conventional ladder racks generally comprise a moving clamping bar engaging a ladder rung.

Means are provided to rotate the bar from a lower release position to an upper clamped position. The clamping bar exerts a clamping force through releasable spring loading of an attached coil spring, spiral spring or spring steel handle.

With conventional ladder racks, rapid acceleration or deceleration, and vertical jolts as the vehicle travels over rough surfaces or bumps, induce forces in the ladder which tend to release the clamping bar, since upward or longitudinal reaction on the clamping bar tends to pivot it toward the unclamped position. As a consequence the ladder may be inadequately secured.

The invention reduces or eliminates this disadvantage of conventional ladder racks through the use of manually operable means which pivot a hooked clamping bar about a horizontal axis from a lower release position through an upper intermediate position and slides it downwardly relative to the horizontal axis from the intermediate position to a clamped position. The path travelled by the hooked end of the clamping bar is therefore not circular as in conventional clamping bars, but results from a combination of pivoting and sliding motion in a path which is primarily vertical near its clamped position and is primarily circular near its intermediate position. Longitudinal forces induced by vehicular motion cannot release the ladder since the clamping bar must first travel vertically upward. Vertical forces inducing upward movement of the clamping bar will not release the ladder since it is retained by the hooked end, and can be resisted mechanically by locking in the clamped position. The ladder rung can therefore be firmly locked by mechanical means.

A further advantage f the invention over conventional ladder racks is the relative simplicity of design and lack of need for a spring member which can wear out through use. The simple design results in savings of manufacturing costs, installation time and repair costs.

DETAILED DESCRIPTION

A ladder supporting rack for mounting upon the roof of a vehicle is provided.

Figure 1:
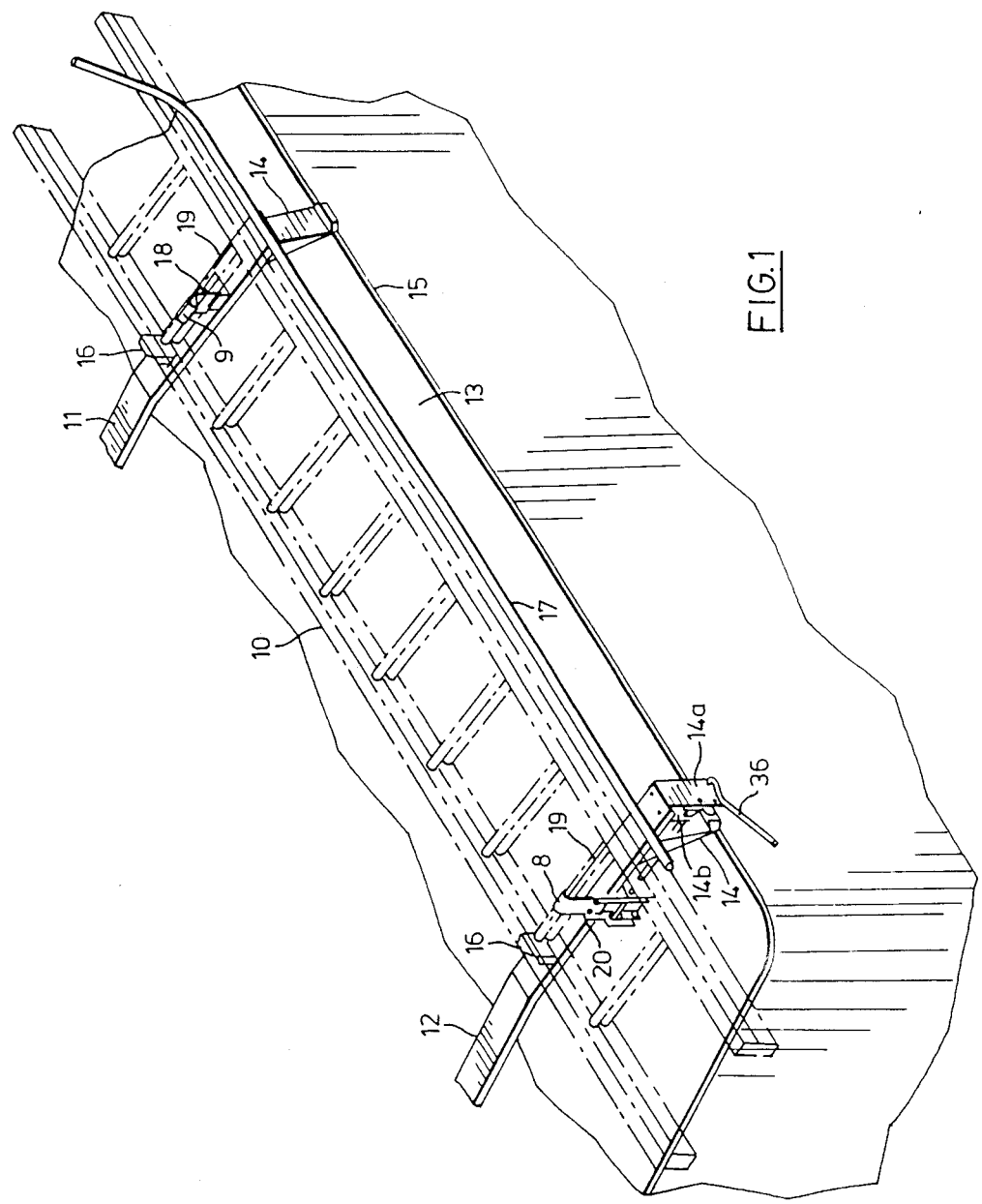
FIG. 1 is a perspective view of the vehicle ladder rack mounted upon the edge of a vehicle roof showing the dotted outline of a supported ladder.

FIG. 1 shows a perspective view of the rack and supported ladder 10. The rack comprises a horizontal frame which in the embodiment shown has forward and rearward transverse beams 11 and 12, spanning over the roof 13 between support brackets 14 attached to the vehicle roof gutter seam 15. An end of the beam 12 has a support plate 14a secured to it, the plate 14a extending vertically and having elements of the clamping mechanism supported on it. The ladder 10 is supported in a horizontal position between inner and outer lateral abutments 16 and 17 which restrain transverse movement of the ladder. A forward end of the frame has an upstanding abutment 18 which engages a ladder rung 19 restraining longitudinal forward movement of the ladder. Abutment 18 includes a vertical restraint member 9 extending longitudinally rearwardly from its upper end. At an opposite end of the frame supported on beam 12 is a clamping bar 20 having a hooked free end 8 extending longitudinally of the bar and engaging a ladder rung 19. The vertical restraint member 9 and the hooked free end 8 of the clamping bar extend longitudinally in opposite directions.

Figure 2:
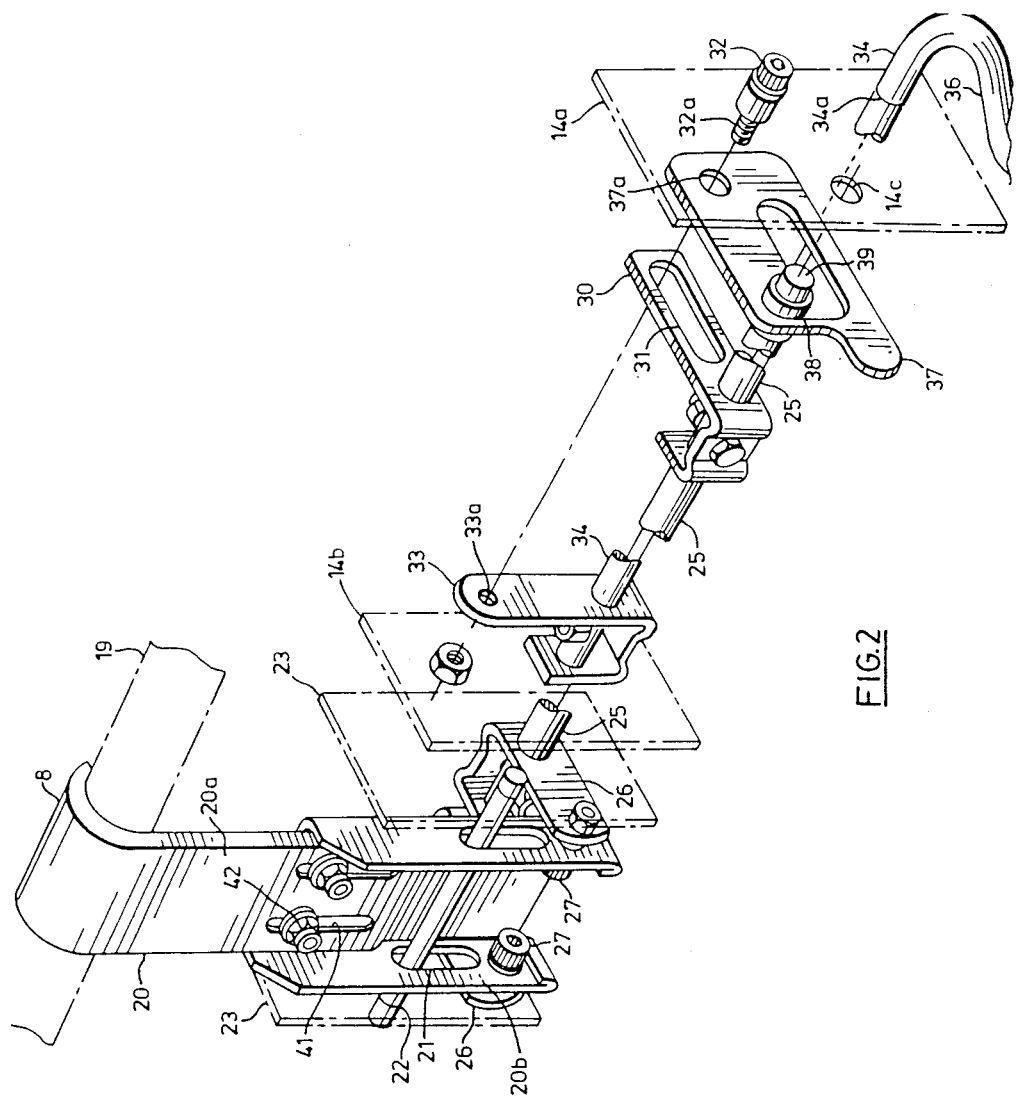
FIG. 2 is a partially exploded perspective view of the clamping bar and of the moving parts of the rack.

FIG. 2 shows a partially exploded perspective view of the clamping bar 20 and the moving parts of the rack. The clamping bar 20 is connected to the frame such that the clamping bar pivots about a transverse horizontal axis and slides perpendicular to the horizontal axis.

Figure 4:
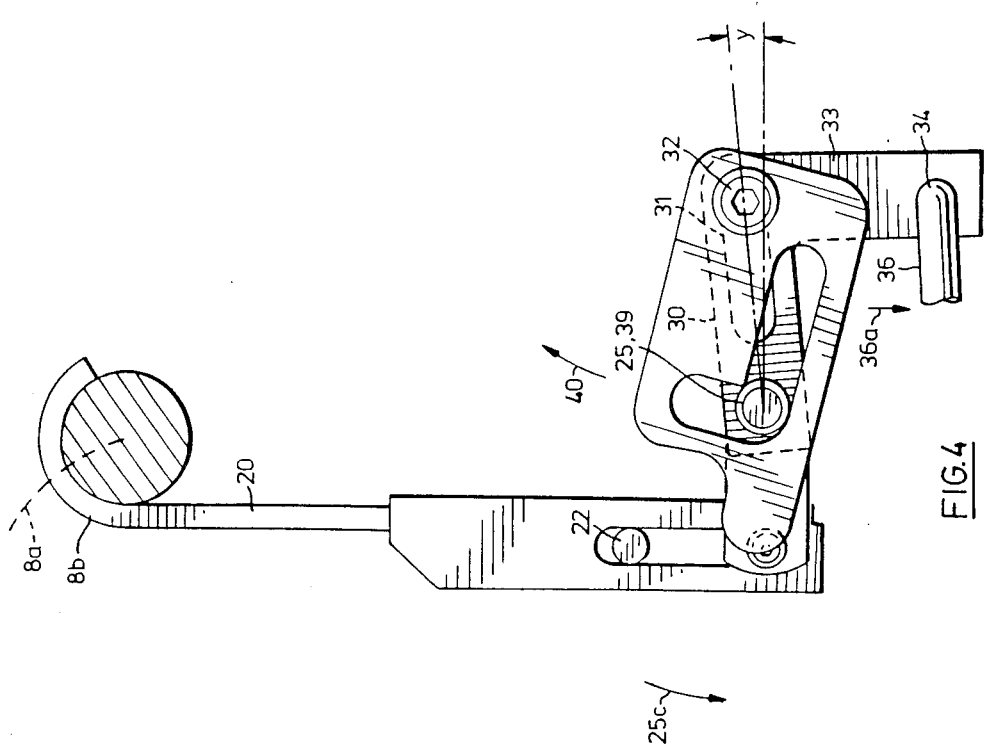
FIG. 3 to FIG. 6 are elevation views of the moving portions of the invention showing the progressive operating sequence from a clamped latched position in FIG. 3, to a clamped unlatched position in FIG. 4, to an upper intermediate position in FIG. 5, to a lower release position in FIG. 6.
Figure 5:
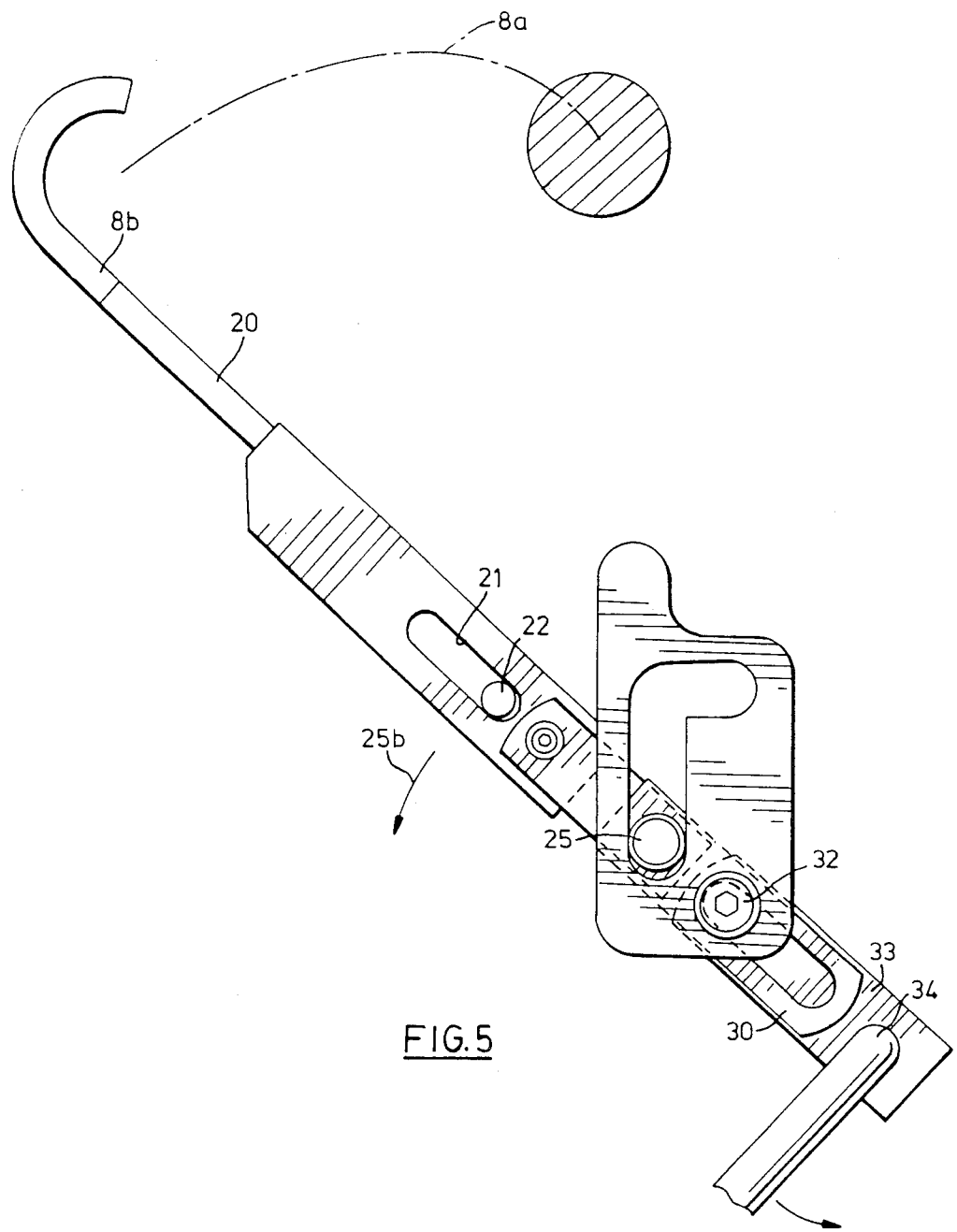
Figure 6:
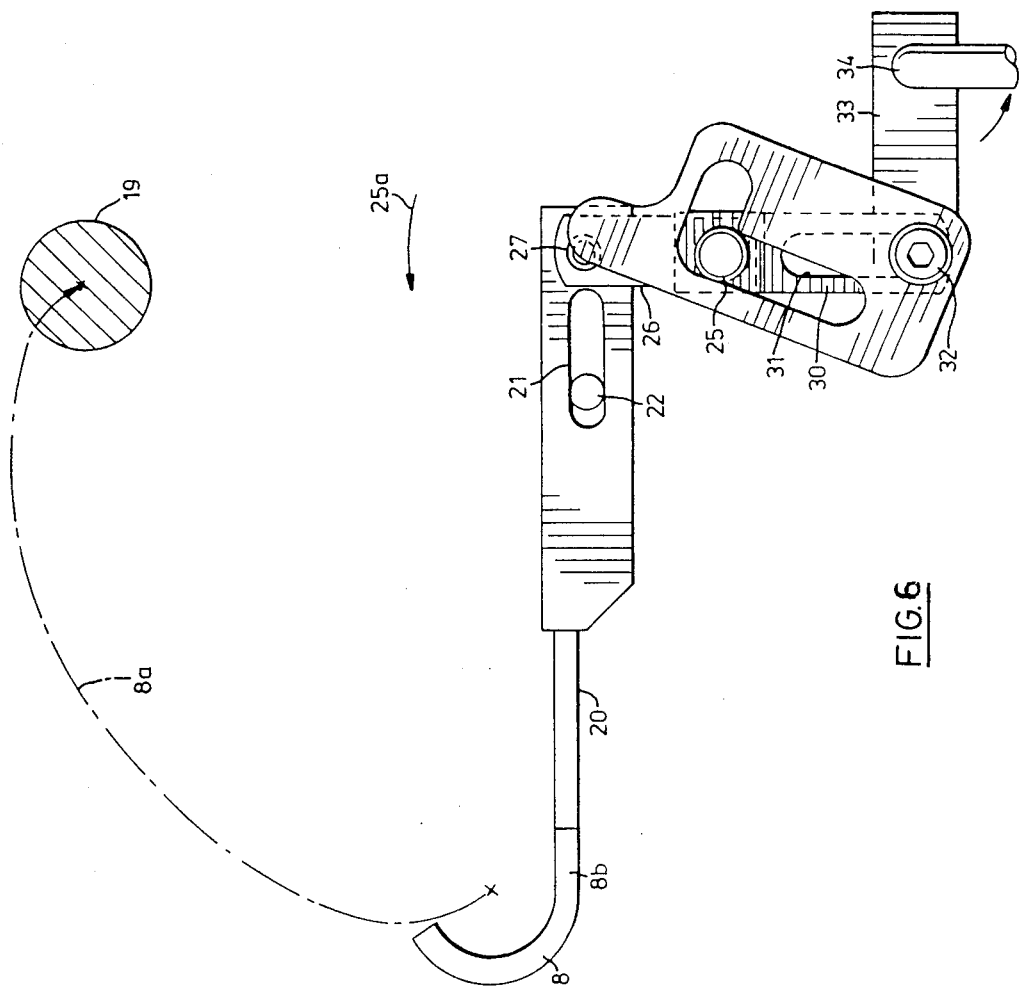

The rack includes manually operable means pivoting the clamping bar 20 about the horizontal axis from a lower release position shown in FIG. 6 through an upper intermediate position shown in FIG. 5 and sliding it downwardly in novel manner relative to the horizontal axis from the intermediate position to a clamped position as shown in FIG. 4, whereby the hooked end 8 can clamp downwardly on the ladder rung 19.

In FIG. 2 it can be seen that the intermediate portion of the clamping bar 20 has a slot 21 extending longitudinally in it. A support pin 22 extends transversely through slot 21 parallel to the horizontal axis. The support pin 22 is attached at each end to frame brackets 23 which are rigidly connected to the beam 12.

Manually operable means comprise an operating shaft 25, clamp lever arms 26, pivot pins 27 and means for rotating the operating shaft about its axis. Operating shaft 25 is journalled for rotation about a horizontal axis. One end of the shaft 25 may, for example, e journalled in an aperture 14c in the support plate 14a, and the opposite end may be journalled in apertures (not shown) in the brackets 23. Clamp lever arms 26 each have one end secured on the operating shaft 25 and have an opposite end pivotally connected with pivot pins 27 to an end of the clamping bar 20 opposite its hooked end 8. In the particular embodiment shown in the drawings, means for rotating the operating shaft 25 are provided in the form of an actuating mechanism drivingly connected to the clamping bar. The actuating mechanism shown may, however, be replaced by other means for rotating the operating shaft 25 about its axis, for example a crank handle at a lateral side of the frame directly connected on the operating shaft 25, and means to lock the crank handle in the clamped position.

From inspection of the sequence of operation shown in FIGS. 6, 5 and 4, the interaction of the components described above can be seen. FIG. 6 shows the bar 20 in a lower release position. Ladder rung 19 is positioned in its approximate final clamped location by the operator placing the ladder upon the frame between the lateral abutments and sliding the ladder longitudinally until one ladder rung is positioned adjacent to or engages abutment 18. Operating shaft 25 is then rotated anticlockwise about its axis, as seen in FIG. 6, and clamp lever arm 26 exerts a rotational force on the end of clamping bar 20 through pivot pin 27, as indicated by the arrow 25a in FIG. 6. Initially, the clamping bar 20 is displaced primarily horizontally rearwardly as slot 21 slides over fixed support pin 22.

As counterclockwise rotation of operating shaft 25 continues to the position of FIG. 5, the clamping bar pivots about the pin 22 from the lower release position shown in FIG. 6, to the upper intermediate position of FIG. 5. As counterclockwise rotation of operating shaft 25 continues, as indicated by the arrow 25b in FIG. 5, clamping bar 20 pivots about support pin 22 from the intermediate position shown in FIG. 5 to the clamped position shown in FIG. 4. As the bar 20 approaches the clamped position in FIG. 4, it travels primarily vertically downward as the slot 21 is drawn downwardly over support pin 22 by the downward force applied by the rotation of the shaft 25 and lever 26 as indicated by the arrow 25c in FIG. 4. Thus, in the clamped position, the ladder rung 19 is compressed downwardly beneath the hooked end 8. From the description of the interaction of the components above it can be seen that, although the motion of the clamping bar 20 is at all times a combination of pivoting about a horizontal axis and sliding perpendicular to the horizontal axis, at the beginning and end of the sequence of operation the motion is primarily a sliding motion and at the intermediate stage of the sequence of operation the motion is primarily a pivoting motion. The arc of movement of the hooked end 8 of the bar 20 is shown by the broken line 8a in FIGS. 4, 5 and 6.

An advantage of the arrangement shown in the drawings over conventional racks is that the hooked end 8 of clamping bar 20 clamps downwardly on the ladder rung 19 since at the end of the sequence of operation the hooked end slides primarily downwards to the clamped position. The ladder rung is more securely clamped since longitudinal reaction on the bar 20 will not tend to unclamp the bar. Rotation of the operating shaft 25 can be prevented by an actuating and latching mechanism as described in detail below.

In the embodiment of the invention shown in the drawings a novel actuating mechanism is provided for rotating the operating shaft about its axis, and for locking the operating shaft in the clamped position.

FIG. 2 shows an exploded perspective view of the actuating mechanism comprising a slide lever arm 30 secured on the operating shaft 25, a pivot pin 32, a crank lever arm 33 secured on a crank shaft 34, a crank handle 36 on the shaft 34, and a slotted plate 37. Slide lever arm 30 has a slot 31 extending longitudinally along it. Pivot pin 32 engages in the slot 31 and is secured to the crank lever arm 33 by a threaded shaft 32a secured in a hole 33a in the crank lever arm 33. As seen in, for example, FIG. 4, the crank shaft 34 extends horizontally parallel to the operating shaft 25 and is spaced forwardly and downwardly therefrom. Crank shaft 34 is journalled in an opening 34a in the plate 14a and in a corresponding opening in a plate 14b parallel to and spaced inwardly from the plate 14a and likewise secured to the beam 12.

The slotted plate 37 has a hole 37a through it, through which passes the pivot pin 32. The plate 37 is retained pivotally on the pin 32 between the slide lever arm 30 and the plate 14a. In the embodiment shown in the drawings the crank lever arm 33 and pivot pin 32 extend adjacent an end of the slot 31 remote from the operating shaft 25.

Following the sequence of operation shown in FIGS. 3, 4 5 and 6, the interaction of the components comprising the actuating mechanism and latching means can be seen.

In the locked position shown in FIG. 3, the actuating mechanism, described below, maintains a torque on the operating shaft 25 in the counter clockwise direction, as seen in the arrow 25d in FIG. 3, holding the hooked end 8 compressed downward over the rung 19. As a result of the resilience of the rung 19, the tensile resilience of the clamping bar 20, and the torsional resilience of the shaft 25, a resilient reaction torque, in the sense of the arrow 25e in FIG. 3, is applied to the shaft 25.

In the locked position, the crank lever arm 33 extends slightly obliquely to the slot 31 in the slide lever arm 30. In FIG. 3 the offset of the crank lever arm from the vertical is shown somewhat exaggeratedly by angle x. When a force is applied manually to crank handle 36 to rotate the crank shaft 34 and crank lever arm 33 in a counterclockwise direction, as shown by the arrow 36a in FIGS. 3 and 4, the crank lever arm 33 moves from the locked position in FIG. 3 to the position in FIG. 4, and angle x tends to zero. The pin 32 pivots within and is displaced rearwardly (leftwardly in FIGS. 3 and 4) along the slot 31 and tends to urge the slide lever arm upwardly, toward the inclined position shown somewhat exaggeratedly by the angle y in FIG. 4. The slide lever arm 30 is thus initially deflected in a sense against the reaction torque in the operating shaft 25, tending to further increase the clamping pressure on the ladder rung. Therefore, there is considerable resistance to movement of the handle 36 counterclockwise, so that the feature that initially the actuating mechanism increases clamping pressure when unclamped, ensure that the ladder is securely held and is not likely to be released as a result of vehicular motion. On continued counterclockwise rotation of the crank lever arm 33 from the position shown in FIG. 4 pivot pin 32 slides along slot 31 until the arm 33 is perpendicular to arm 30, thereafter swinging slide lever arm 30 in a clockwise direction opposite to its initial movement. Since the slide lever arm 30 is secured to operating shaft 25 the resulting rotation of the operating shaft 25 releases the clamping bar 20, moving it to the intermediate position shown in FIG. 5 and to the lower release position shown in FIG. 6.

Figure 3:
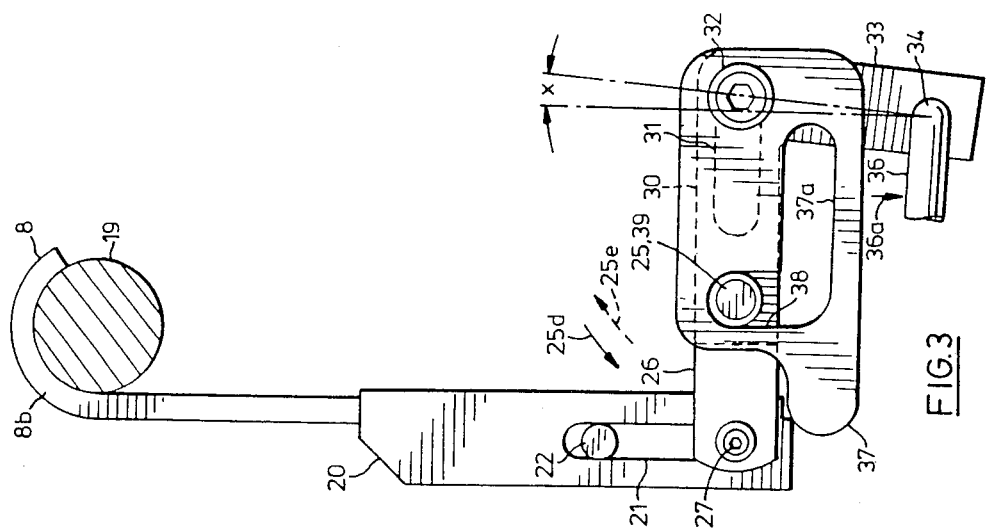

The hooked end 8 of the clamping bar 20 may carry a compressible plastic, e.g., vinyl resin, coating 8b which is compressed in the clamped position of FIG. 3, thus contributing to the resilient reaction torque referred to above.

To further guard against accidental unclamping, in the preferred form, shown in the drawings, the slotted plate 37 serves as a latch positively retaining the mechanism in the clamped position. A slot 37a in the plate 37 includes a notch 38 which receives a pin 39 constituted by an end of the operating shaft 25. Hence in the latched position, seen in FIG. 3, the plate 37 spaces the shaft 25 from the pin 32. To unclamp the mechanism, a portion of the plate 37 projecting laterally beyond the edge of the plate 14a must be lifted with the thumb as the hand grasps the crank shaft, as seen in FIG. 4, so that the plate 37 is free to be displaced rearwardly relative to the shaft 25, in the direction of arrow 40, allowing the pin 32 to be rotated toward the shaft 25.

To clamp the ladder rung, a sequence opposite to the one above is carried out. In moving from the intermediate position of FIG. 5 to the clamped position of FIG. 4 the end of slot 31 acts as stop means preventing further rotation of the crank shaft in a clockwise direction which would unclamp the ladder rung. On completion of the clamping movement, the plate 37 drops by gravity to the latched position of FIG. 3.

In the preferred form as shown, the clamping bar 20 is formed in two parts namely, an upper hooked plate portion 20a, formed with slots 41 through which are passed threaded fasteners 42 securing the portion 20a to a lower channel section portion 20b. The channel sides of the portion 20b are formed with the slots 21 and provide also the pivotal connection to the pins 27. On loosening the fasteners 42, the position of the upper portion 20a relative to the lower portion 20b can be adjusted, allowing the user to select a predetermined clamping tension in the bar 20 when clamped onto the rung 19 in the clamping position.

It will be appreciated that the actuating mechanism described above may be employed with any clamping arrangement wherein a resilient reaction torque is applied to the shaft 25 and therefore may, at least in theory, be applied to actuating simply pivoting clamping bars such as are known in the prior art, although with considerably less advantage.

I claim:

1. A ladder supporting rack for the roof of a vehicle comprising:
   a frame having at one end an abutment for engaging one end of a ladder and restraining it against longitudinal movement;
   a clamping bar at an opposite end of the frame;
   means connecting the clamping bar to the frame for pivoting about a transverse horizontal axis and for sliding perpendicular to said horizontal axis;
   said clamping bar having a hooked free end extending longitudinally of the bar;
   and manually operable means pivoting the clamping bar about said horizontal axis from a lower release position through an upper intermediate position and sliding it downwardly relative to said horizontal axis from said intermediate position to a clamped position, whereby said hooked end can clamp downwardly on a ladder rung.

2. A rack as claimed in claim 1 wherein said abutment includes a vertical restraint member extending from an upper end of said abutment longitudinally in the direction opposite to said hooked free end of said clamping bar.

3. A ladder supporting rack for the roof of a vehicle comprising:
   a frame having at one end an abutment for engaging one end of a ladder and restraining it against longitudinal movement;
   a clamping bar at an opposite end of the frame;
   means connecting the clamping bar to the frame for pivoting about a transverse horizontal axis and for sliding perpendicular to said horizontal axis;
   said clamping bar having a hooked free end extending longitudinally of the bar;
   and manually operable means pivoting the clamping bar about said horizontal axis from a lower release position through an upper intermediate position and sliding it downwardly relative to said horizontal axis from said intermediate position to a clamped position, whereby said hooked end can clamp downwardly on a ladder rung, wherein said clamping bar has an intermediate portion connected to the frame through said connecting means and said manually operable means comprises an operating shaft journalled for rotation parallel to said horizontal axis, a clamp lever are having one end connected on the operating shaft and having its opposite end pivotally connected to an end of of the clamping bar opposite said hooked end, and means for rotating said operating shaft about its axis.

4. A rack as claimed in claim 3 wherein said means for rotating comprises a crank handle at a lateral side of said frame, drivingly connected to said operating shaft, and means to lock said crank handle in the clamped position.

5. A ladder supporting rack for the roof of a vehicle comprising:
   a frame having at one end an abutment for engaging one end of a ladder and restraining it against longitudinal movement;
   a clamping bar at an opposite end of the frame;
   means connecting the clamping bar to the frame for pivoting about a transverse horizontal axis and for sliding perpendicular to said horizontal axis;
   said clamping bar having a hooked free end extending longitudinally of the bar;
   and manually operable means pivoting the clamping bar about said horizontal axis from a lower release position through an upper intermediate position and sliding it downwardly relative to said horizontal axis from said intermediate position to a clamped position, whereby said hooked end can clamp downwardly on a ladder rung, wherein said connecting means comprises a slot extending longitudinally in said clamping bar, a support pin extending transversely through said slot parallel to said horizontal axis and a bracket connecting each end of the support pin to the frame.

6. A rack as claimed in claim 5 wherein said abutment includes a vertical restraint member extending from an upper end of said abutment longitudinally in the direction opposite to said hooked free end of said clamping bar.

7. An actuating mechanism for a resilient clamping bar comprising:
   a frame;
   an operating shaft journalled for rotation in the frame about its axis for exerting clamping pressure on the clamping bar when rotated in a first sense and having thereby applied to it a resilient reaction torque in an opposite sense;
   a slide lever arm secured to and extending laterally from the operating shaft and having sliding means extending longitudinally along it;
   a pivot pin pivotally engaging the slide means;
   a crank lever arm connected to and extending laterally from the pivot pin in the direction opposite said first sense to a crank shaft journalled for rotation in the frame about an axis parallel to said operating shaft axis, said crank lever arm secured to said crank shaft;

said mechanism being movable from a locked position, having said crank lever arm extending obliquely to said slide lever arm and said pivot pin engaging said slide lever arm adjacent one end thereof, on rotation of the crankshaft in a direction tending to unclamp the mechanism, and said crank lever arm rotating to an intermediate position perpendicular to said slide lever arm wherein said slide lever arm is initially deflected in said first sense against said reaction torque, and on continued rotation said crank lever arm swinging said slide lever arm in the direction opposite to said first sense and thereby unclamping said clamping bar; and stop means for preventing rotation of said crank shaft from said locked position and in the direction opposite to the direction tending to unclamp the mechanism.

8. A mechanism as claimed in claim 7 wherein said crank lever arm and said pivot pin extend adjacent an end of said slide means remote from said operating shaft axis.

9. A mechanism as claimed in claim 7 wherein said slide means comprises a slot in said slide lever arm in which said pivot pin is located.

10. A mechanism as claimed in claim 7 including latching means in the form of spacing means pivotally connected to the axis of one of said pivot pin and said operating shaft, and pivoting between a latching position spacing said pivot pin axis from said operating shaft axis in said latched position; and a release position allowing relative movement between said pivot pin axis and said operating shaft axis.

11. A mechanism as claimed in claim 10 wherein said spacing means comprises a slotted plate pivoted about said one axis and having a notch in said slot engaging the other of said pivot pin axis and said operating shaft axis.

12. A mechanism as claimed in claim 11 wherein said notch engages a pin member secured to said operating shaft axis.

13. A ladder supporting rack for the roof of a vehicle comprising:

a frame having at one end an abutment for engaging one end of a ladder and restraining it against longitudinal movement;

a clamping bar at an opposite end of the frame;

means connecting the clamping bar to the frame for pivoting about a transverse horizontal axis and for sliding perpendicular to said horizontal axis;

said clamping bar having a hooked end extending longitudinally of the bar;

and manually operable means for pivoting the clamping bar about said horizontal axis from a lower release position through an upper intermediate position and sliding it downwardly relative to said horizontal axis from said intermediate position to a clamped position, whereby said hooked end clamps downwardly on a ladder rung, said manually operable means comprising an operating shaft journalled parallel to said horizontal axis, a clamp lever arm having one end connected to the operating shaft and having its opposite end pivotally connected to an end of the clamping bar opposite said hooked end, whereby rotation of the operating shaft in a first sense rotates the clamping bar and slides it downwardly toward the clamped position and applies a reaction torque to the operating shaft in a sense opposite said first sense;

an actuating mechanism for rotating said operating shaft about its axis comprising:

a slide lever arm extending laterally from the operating shaft and having slide means extending longitudinally along it;

a pivot pin pivotally engaging the slide means;

a crank lever arm connected to and extending laterally from the pivot pin in the direction opposite said first sense to a crank shaft journalled for rotation in the frame about an axis parallel to said operating shaft axis, said crank lever arm secured to said crank shaft;

said actuating mechanism being movable from a locked position, having said crank lever arm extending obliquely to said slide lever arm and said pivot pin engaging said slide lever arm adjacent one end thereof, on rotation of the crankshaft in a direction tending to unclamp the mechanism, and said crank lever arm rotating to an intermediate position perpendicular to said slide lever arm, wherein said slide lever arm is initially deflected in said first sense against said reaction torque, and on continued rotation said crank lever arm swinging said slide lever arm in the direction opposite to said first sense and thereby unclamping said clamping bar; and stop means for preventing rotation of said crankshaft from said locked position and in the direction opposite to the direction tending to unclamp the mechanism.

14. A rack as claimed in claim 13 wherein said clamping bar has an intermediate portion connected to the frame through said connecting means.

15. A rack as claimed in claim 13 wherein said connecting means comprises a slot extending longitudinally in said clamping bar, a support pin extending transversely through said slot parallel to said horizontal axis and a bracket connecting each end of the support pin to the frame.

16. A rack as claimed in claim 13 wherein said abutment includes a vertical restraint member extending from an upper end of said abutment member longitudinally in the direction opposite to said hooked free end of said clamping bar.

17. A rack as claimed in claim 13 wherein said crank lever arm and said pivot pin extend adjacent an end of said slide means remote from said operating shaft axis.

18. A rack as claimed in claim 13 wherein said slide means comprises a slot in said slide lever arm in which said pivot pin is located.

19. A rack as claimed in claim 13 including latching means in the form of spacing means pivotally connected to the axis of one of said pivot pin and said operating shaft and pivoting between a latching position spacing said pivot pin axis from said operating shaft axis in said locked position; and a release position allowing relative movement between said pivot pin axis and said operating shaft axis.

20. A rack as claimed in claim 19 wherein said spacing means comprises a slotted plate pivoted about said one axis and having a notch in said slot engaging the other of said pivot pin axis and said operating shaft axis.

21. A rack as claimed in claim 20 wherein said notch engages a pin member secured to said operating shaft axis.

* * * * *